(12) United States Patent
Hahn

(10) Patent No.: US 10,548,186 B2
(45) Date of Patent: Jan. 28, 2020

(54) METHOD FOR CONTROLLING A HEATING DEVICE FOR HEATING A COMPONENT, CONTROL DEVICE AND MOTOR VEHICLE WITH SAME

(71) Applicant: VOLKSWAGEN AG, Wolfsburg (DE)

(72) Inventor: Hermann Hahn, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 619 days.

(21) Appl. No.: 14/110,886

(22) PCT Filed: Feb. 25, 2013

(86) PCT No.: PCT/EP2013/053665
§ 371 (c)(1),
(2) Date: Oct. 9, 2013

(87) PCT Pub. No.: WO2013/131769
PCT Pub. Date: Sep. 12, 2013

(65) Prior Publication Data
US 2014/0367371 A1   Dec. 18, 2014

(30) Foreign Application Priority Data

Mar. 5, 2012 (DE) ........................ 10 2012 203 401

(51) Int. Cl.
*H05B 1/02* (2006.01)
(52) U.S. Cl.
CPC ................... *H05B 1/0236* (2013.01)
(58) Field of Classification Search
CPC .. F01N 2560/05; F01N 11/00; F01N 2590/11; F01N 2610/02; F01N 3/2066;
(Continued)

(56) References Cited

U.S. PATENT DOCUMENTS 4,655,182 A * 4/1987 Nakano ............... F02D 41/1494
123/179.1
4,694,809 A * 9/1987 Nakano ............... G01N 27/4067
123/684
(Continued)

FOREIGN PATENT DOCUMENTS

CN   101171510 A   4/2008
CN   101410712 A   4/2009
(Continued)

OTHER PUBLICATIONS

International Search Report issued for PCT International Application No. PCT/EP2013/053665, dated Jun. 5, 2013.
(Continued)

*Primary Examiner* — Tu B Hoang
*Assistant Examiner* — Masahiko Muranami
(74) *Attorney, Agent, or Firm* — Pearl Cohen Zedek Latzer Baratz LLP

(57) ABSTRACT

A control device controls a heating device for heating a component, in particular a lambda sensor. The method comprises the cyclically repeating steps: operating the heating device at a heating voltage, ascertaining a current heating voltage (U_H_a) of the heating device, ascertaining a mean heating voltage (U_H_m) for a predetermined, immediately preceding period of time, determining a maximum permissible heating period (T_max) for which the component may be heated for the maximum length of time using the current heating voltage (U_H_a) or using the mean heating voltage (U_H_m), in dependence upon the mean heating voltage (U_H_m), comparing the current heating voltage (U_H_a) and the mean heating voltage (U_H_m) with a predetermined minimum heating voltage (U_H_min), and reducing the heating voltage of the heating device if the current heating voltage (U_H_a) and/or the mean heating voltage (U_H_m) exceeds the predetermined minimum
(Continued)

heating voltage (U_H_min) for the duration of the maximum permissible heating period (T_max).

15 Claims, 3 Drawing Sheets

(58) Field of Classification Search
CPC ...... F01N 9/00; F02D 41/222; F02D 41/1494; F02D 41/0055; F02D 41/029; F02D 41/1466; F02D 31/02; F02D 31/12; F02D 31/135; Y02T 10/40; Y02T 10/47; G01N 15/0656; G01N 27/4067
USPC ....... 219/202, 205, 374, 509, 510, 494, 264, 219/492, 497, 499, 482, 481, 508, 501; 392/312, 318; 374/141, 144; 123/339.12, 697, 685, 549; 701/53
See application file for complete search history.

(56) References Cited

U.S. PATENT DOCUMENTS

| | | | | |
|---|---|---|---|---|
| 4,715,343 A * | 12/1987 | Kinoshita | ........... | F02D 41/1494 123/697 |
| 4,721,088 A * | 1/1988 | Mieno | ................ | F02D 41/1494 123/686 |
| 4,873,642 A * | 10/1989 | Mieno | ................... | F02D 41/062 123/697 |
| 5,293,028 A * | 3/1994 | Payne | ................... | F24C 15/106 219/485 |
| 5,640,080 A * | 6/1997 | Tamai | ................... | H01M 10/44 320/141 |
| 5,696,313 A * | 12/1997 | Hafele | ............... | G01N 27/4067 73/23.31 |
| 6,294,075 B1 * | 9/2001 | Poggio | ................ | F02D 41/1496 123/697 |
| 6,304,813 B1 | 10/2001 | Ikeda et al. | | |
| 2002/0179443 A1 * | 12/2002 | Hada | ................... | F02D 41/1494 204/408 |
| 2004/0176904 A1 * | 9/2004 | Toyoshtima | ............ | F01N 3/101 701/113 |
| 2005/0173406 A1 * | 8/2005 | Kurumagawa | ........ | B62K 21/26 219/482 |
| 2005/0205550 A1 * | 9/2005 | Saito | ................... | F02D 41/1494 219/497 |
| 2006/0042965 A1 * | 3/2006 | Sasaki | ..................... | G01N 27/16 205/784 |
| 2008/0087005 A1 | 4/2008 | Wahl et al. | | |
| 2009/0038289 A1 * | 2/2009 | Oh-Hori | ............... | G01N 27/122 60/285 |
| 2010/0133116 A1 * | 6/2010 | Ieda | ..................... | G01N 27/407 205/775 |
| 2011/0036069 A1 | 2/2011 | Hahn | | |

FOREIGN PATENT DOCUMENTS

| | | |
|---|---|---|
| CN | 101611311 A | 12/2009 |
| CN | 102108906 A | 6/2011 |
| DE | 198 07 345 A1 | 9/1998 |
| DE | 10015282 A1 | 11/2000 |
| DE | 10229026 A1 | 1/2004 |
| DE | 102005006760 A1 | 8/2006 |
| DE | 102005020363 A1 | 11/2006 |
| DE | 102008011833 A1 | 9/2009 |
| DE | 102008011834 A1 | 9/2009 |
| DE | 102008013515 A1 | 9/2009 |
| DE | 102009027378 A1 | 1/2011 |
| EP | 0822326 A2 | 2/1998 |
| JP | 58-190651 | 11/1983 |
| JP | 2000-206082 | 7/2000 |
| JP | 2003-240749 | 8/2003 |
| JP | 2005-121005 | 5/2005 |
| WO | WO 2006/117357 | 11/2006 |

OTHER PUBLICATIONS

Office Action for Chinese Patent Application No. 201380001245, dated Jun. 2, 2015.
Office Action for Japanese Patent Application No. 2014-504359, dated Jul. 14, 2014.
German Search Report for German Application No. 10 2012 203 401.3, dated Jul. 26, 2012.

* cited by examiner

METHOD FOR CONTROLLING A HEATING DEVICE FOR HEATING A COMPONENT, CONTROL DEVICE AND MOTOR VEHICLE WITH SAME

CROSS-REFERENCE TO RELATED APPLICATIONS

This application is a National Phase Application of PCT International Application No. PCT/EP2013/053665, International Filing Date Feb. 25, 2013, which claims priority to German Patent Application No. 10 2012 203 401.3, filed Mar. 5, 2013, each of which are hereby incorporated by reference.

BACKGROUND OF THE INVENTION

The invention relates to a method for controlling a heating device for heating a component, in particular an exhaust gas sensor. The invention further relates to a correspondingly designed control device and a motor vehicle that comprises a control device of this type for controlling a heating device for heating a component, in particular an exhaust gas sensor.

It is known to control or to regulate internal combustion engines in dependence upon a composition of their exhaust gases, wherein the corresponding exhaust gas component is measured by means of a suitable exhaust gas sensor. In particular, the air-fuel ratio with which the engine is being driven is regulated in that the oxygen content of the exhaust gas is measured by means of a lambda sensor in the exhaust gas tract. The lambda sensor provides a sensor signal that is dependent upon the oxygen content of the exhaust gas, which sensor signal is usually a sensor voltage. However, the operational readiness of the exhaust gas sensor requires a specific minimum temperature of for example 300 to 400° C.

Currently available lambda sensors comprise efficient heating elements in order for the operational readiness of the sensor to be achieved rapidly upon activation of said lambda sensor and thus to ensure an emission-optimized engine control. This has the side effect that it is necessary to control precisely the heating voltage and the period of time that heat is applied. Otherwise, the sensor can be damaged as a result of high temperatures or thermal stresses. For this reason, maximum permissible heating voltages are generally defined and said voltages must not be exceeded during the heating strategy. Moreover, it is known to specify a maximum permissible period of time during which the sensor may be subjected to the maximum heating voltage. Moreover, the permissible period of time that heating can be provided at a maximum voltage can be made dependent upon additional criteria, for instance on the external temperature or on the preceding period of time during which the sensor is not heated, which renders it possible to take into consideration the sensor temperature at the commencement of the heating process. This is necessary owing to the fact that damage can also occur as a result of heating voltages that are lower than the maximum permissible voltage, if they are applied over longer periods of time.

Currently available lambda sensors may be heated for example using a maximum voltage of 14V in the case of a likewise specified maximum period of time. However, even if a sensor of this type is to be heated permanently using 13V, a maximum period of time is to be maintained and if said time limit is exceeded, it is to be expected that the sensor will be damaged. Although this maximum period of time is somewhat greater than the maximum period of time in the case of a 14V heating voltage, it must still be taken into consideration.

It is known from DE 10 2005 006 760 A1 to conduct the heating of lambda sensors in different phases, wherein in the initial phase, the heating voltage is rapidly brought to a high voltage, preferably to the full operational voltage, and is subsequently reduced in steps or in a ramp-like manner. In this manner, the sensor is to be heated as rapidly as possible but without being damaged. In addition, it is possible even prior to starting the engine, for instance when opening the driver's door, to provide preliminary heating using an extremely low heating voltage, for example 2V.

DE 10 2005 020 363 A1 also proposes that the lambda sensor is pre-heated even prior to starting the engine, for example upon activating the door contact. Initially, the sensor is heated using a higher initial voltage with a high rate of temperature increase to a temperature above the dew point temperature but below a thermal shock temperature so that existing condensation water can evaporate. If the first temperature is achieved, heating is continued using a reduced heating voltage in order to bring the sensor up to the target temperature at a lower rate of temperature increase yet still providing protection against over-heating. In order further to counteract any excessive heating, the duration of the heating process is limited.

DE 102 29 026 A1 describes an electrical circuit arrangement for heating a lambda sensor by means of a power output stage in the form of a field effect transistor (FET). The voltage drop is measured by way of the heating resistor and the FET. The power output stage i.e. the gate electrode of the FET, is controlled in dependence upon the feedback signal that is produced in this manner so that to a great extent compensation is made for the voltage that is dropping at the heating consumer. As a result, a variable current limitation is achieved and any uncontrolled overheating that could otherwise destroy the sensor heating arrangement is avoided.

Current strategies for heating sensors are confronted with the problem that it is not possible to predetermine in a precise manner the permissible heating parameters (maximum voltage and the maximum period of time of the maximum heating, but in particular the maximum period of time) in dependence upon different parameters. As a consequence, the sensor is either heated excessively or the permissible parameters are specified with such a large safety margin that the operational readiness of the sensor is achieved later than necessary.

SUMMARY OF THE INVENTION

The object of the present invention is therefore to provide a method and a device for controlling a heating device for lambda sensors and other actively heated components that overcome the described disadvantages of the prior art. The component to be heated is therefore to be heated as quickly as possible and as reliably as possible to its operating temperature.

This object is achieved by virtue of a method for controlling a heating device for heating a component, a correspondingly designed control device and a motor vehicle comprising a control device of this type having the features of the independent claims.

The method in accordance with the invention comprises the cyclically repeating steps:

operating the heating device at a heating voltage, ascertaining a current heating voltage of the heating device, ascertaining a mean heating voltage for a predetermined, immediately preceding period of time, determining a maximum permissible heating period for which the component may be heated for the maximum length of time using the current heating voltage or using the mean heating voltage, in dependence upon the mean heating voltage, comparing the current heating voltage and the mean heating voltage with a predetermined minimum heating voltage, and reducing the heating voltage of the heating device if the current heating voltage and/or the mean heating voltage exceeds the predetermined minimum heating voltage for the duration of the maximum permissible heating period.

The described disadvantages of the prior art are eliminated using this method. In particular, it is possible in a simple manner to limit the heating voltage at which the heating device is operated so that on the one hand the component is reliably prevented from overheating, on the other hand the potential of the heater can be fully exploited. The actual thermal loading on the heated component is ascertained by virtue of ascertaining the mean value of the applied heating voltage for the immediately preceding period of time. The heating strategy in accordance with the present invention is adapted with a high level of accuracy to suit the actual thermal loading on the component by virtue of the fact that the maximum permissible duration of the heating period for which the component may be heated for the maximum period of time using the currently applied heating voltage is permanently updated in dependence upon the ascertained mean heating voltage. If either the currently applied heating voltage or the ascertained mean heating voltage is greater than the predetermined minimum heating voltage, an elapsed-time meter begins to run. If the maximum permissible duration of the heating period is achieved, without the current heating voltage and/or the mean heating voltage dropping below the minimum heating voltage, the heating voltage of the heating device is reduced to the minimum heating voltage.

It goes without saying that the term "heating voltage" also includes parameters that are derived from the heating voltage or parameters that are correlated with said heating voltage, although owing to reasons of clarity and compactness this is not always indicated individually each time. By way of example, the present invention also includes the use of the heating output as a parameter that is correlated with the heating voltage or can be derived from said heating voltage. This naturally also applies for the features "current heating voltage", "mean heating voltage", "minimum heating voltage" etc.

According to an advantageous embodiment of the invention, the heating device is operated at a component-specific maximum permissible heating voltage from the point in time at which the heating process commences. Maximum permissible heating voltages are typically specified by the manufacturers of heated components, in particular of lambda sensors. A typical maximum permissible heating voltage for lambda sensors that are heated by means of a resistance heater is typically 14 volt, less frequently 13 volt. By virtue of the fact that the heating process is commenced using the maximum permissible heating voltage, the component is heated with the greatest possible rate of temperature increase. This ensures that the components are heated as quickly as possible and in the case of lambda sensors that they rapidly achieve their operating temperature.

In a preferred embodiment, it is possible to predetermine the "immediately preceding period of time", for which the mean heating voltage is ascertained, according to the maximum permissible duration of the heating period during which heating occurs using the component-specific maximum permissible heating voltage. In the case of lambda sensors, for example, the maximum permissible duration of the heating period using the maximum permissible heating voltage is typically in the range of a few seconds, for example 6 to 10 seconds, in particular for instance 8 seconds, so that the period of time for ascertaining the mean is also selected accordingly.

In a further advantageous embodiment of the invention, the minimum heating voltage is predetermined in such a manner that when said voltage is applied over longer periods of time, for example for at least 30 seconds, in particular for at least 1 minute, the heated component is not damaged as a result of thermal loading. It is preferred that the minimum heating voltage is dimensioned in such a manner that when said voltage is applied permanently, the heated component is not thermally derogated. This embodiment provides the advantageous effect that if the heating voltage of the heating device is switched to the minimum heating voltage owing to the fact that the maximum permissible duration of the heating period has been achieved, it is ensured that the component continues to be heated without being damaged. It is particularly preferred in this connection that the minimum heating voltage is predetermined to be as high as possible so that when said voltage is applied permanently, the component is not thermally derogated.

Furthermore, in a preferred embodiment of the invention, if the current heating voltage and/or the mean heating voltage exceeds the predetermined minimum heating voltage for the duration of the maximum permissible heating period, the heating voltage of the heating device is reduced to the minimum heating voltage or to a lower heating voltage than the minimum heating voltage. By virtue of the fact that the minimum heating voltage is predetermined to be as high as possible without having to accept that the component will be damaged as a result of thermal loading, it is ensured even when the heating device has been switched to the minimum heating voltage that a heating rate continues that is as high as possible but at the same time is still acceptable.

In a preferred embodiment of the invention, a current output voltage (supply voltage) of an energy source that is operating the heating device is used as the current heating voltage of the heating device, said energy source being in particular a battery, for example a vehicle battery. This parameter is already known in most systems, by way of example vehicles. Furthermore, the voltage that is actually applied at the heating device practically does not differ from the supply voltage. Fundamentally, the measured voltage that is actually applied at the heating device can also in fact be used as the current heating voltage of the heating device. However, it requires an increased outlay to ascertain said measured voltage and this increased outlay does not appear justified in view of the good level of accuracy when using the supply voltage.

It is moreover preferred that after a predetermined reset period of time has elapsed following a reduction of the heating voltage, the heating device is once more operated at the maximum permissible heating voltage. In this manner, the component is heated once more using the higher heating voltage after a specific "cooling-down period" of the component. This embodiment also ensures that the operating temperature of the component is achieved as rapidly as possible. The reset period of time is preferably predetermined in such a manner that after operating the heating device at the minimum heating voltage or rather at the lower heating voltage for the duration of the reset period of time, it is to be expected that the component cools down to a non-critical temperature. In this manner, it is ensured that the component is heated rapidly and nonetheless not damaged.

Although the method in accordance with the invention can be used for any actively heated component in an advantageous manner, a preferred embodiment of the invention provides that the component to be heated is a sensor, in particular an exhaust gas sensor for an internal combustion engine. Said sensor is preferably a lambda sensor.

A further aspect of the present invention relates to a control device for controlling a heating device for heating a component, which control device is designed for implementing the method in accordance with the invention. In particular, the control device has a stored algorithm in computer-readable form for implementing the method. In addition, the control device can comprise characteristic curves and characteristic fields that are necessary or of advantage for implementing the method.

A further aspect of the present invention relates to a motor vehicle comprising an internal combustion engine and an exhaust gas system that is connected to said internal combustion engine and comprises an exhaust gas sensor, which exhaust gas sensor comprises a heating device for heating said exhaust gas sensor. The motor vehicle further comprises a control device for controlling the heating device for heating the exhaust gas sensor, which control device is designed for implementing the method.

Further advantageous embodiments of the invention are the subject matter of the remaining subordinate claims.

BRIEF DESCRIPTION OF THE DRAWINGS

The invention is further explained hereinunder in exemplary embodiments with reference to the associated drawings, in which.

DETAILED DESCRIPTION OF THE INVENTION

Figure 1:
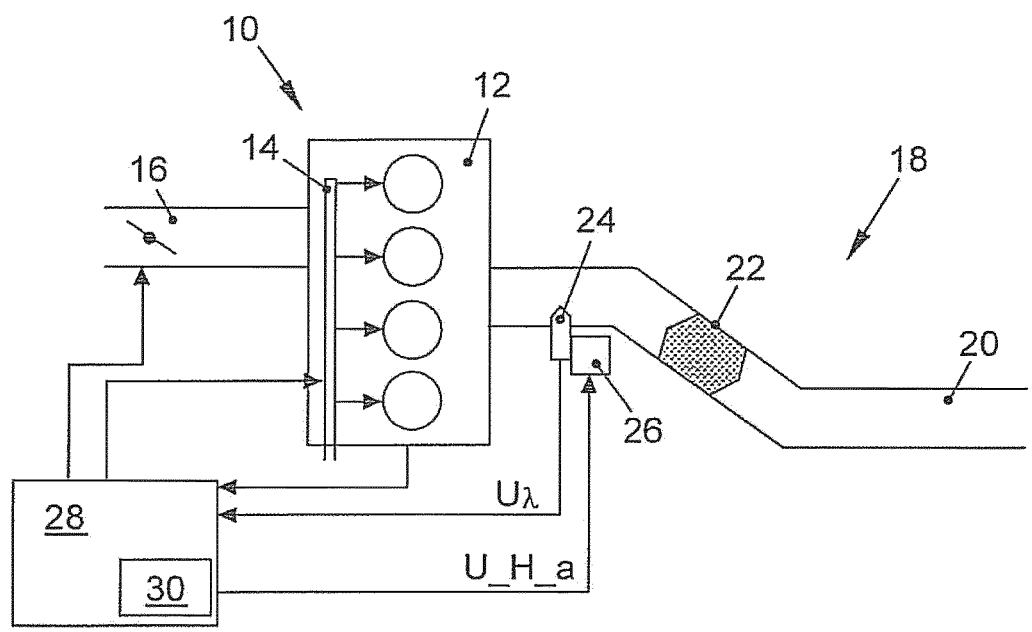
FIG. 1 illustrates an internal combustion engine of a motor vehicle comprising a connected exhaust gas system and lambda sensor and control device for heating the lambda sensor in accordance with the invention.

FIG. 1 illustrates a motor vehicle 10 of which in this figure only the internal combustion engine 12 and the exhaust gas system 18 that is connected thereto are illustrated.

The internal combustion engine 12 is supplied with fuel by way of a fuel supply system 14, for instance in the form of open-combustion chamber injection or an intake-manifold fuel injection. Moreover, combustion air is supplied by way of an air supply system 16 that comprises in particular an air intake manifold. If necessary, the quantity of air being supplied can be regulated by way of a controllable actuator, for example a throttle valve, which is arranged in the air intake manifold.

Exhaust gas that is generated by the internal combustion engine 12 is discharged into the environment by way of an exhaust duct 20 in the exhaust gas system 18, wherein exhaust gas components that would otherwise damage the environment are removed by means of one or several catalytic convertor(s) 22 and/or other exhaust gas treatment devices.

An exhaust gas sensor 24 is arranged inside the exhaust gas duct 20 in a position that is close to the engine and in this case said exhaust gas sensor is a lambda sensor, for example a step response lambda sensor or a broadband lambda sensor. If necessary, one or several further exhaust gas sensors can be provided, in particular also downstream of the catalytic convertor 22. The lambda sensor 24 requires at least a predetermined operating temperature before it provides a (reliable) sensor signal, typically in the form of a sensor voltage $U_\lambda$. The sensor voltage $U_\lambda$ is an indication for the oxygen content of the exhaust gas, so that it is possible by means of a characteristic curve of the sensor to ascertain and regulate the current air-fuel ratio $\lambda$ of the engine 12. In order to achieve this operating temperature of the lambda sensor 24 as rapidly as possible following an engine cold start, said lambda sensor is equipped with a heating device 26 that can be operated at a variable heating voltage. The heating device 26 is typically an electrical resistance heater.

The signals of the exhaust gas sensor 24 (and if necessary further sensors and further operating parameters of the engine 12) are transmitted to an engine control 28. The engine control 28 controls different components of the internal combustion engine 12 in a known manner in dependence upon the incoming signals. In particular, the air-fuel mixture being supplied to the internal combustion engine is regulated in dependence upon the sensor signal (the sensor voltage) of the lambda sensor 24 that is close to the engine, for which purpose the engine control 28 regulates the quantity of fuel that is to be supplied by way of the fuel supply system 14 and/or regulates the quantity of air that is to be supplied by way of the air supply system 16. The engine control 28 comprises a control device 30 that is designed for implementing the method in accordance with the invention for controlling the heating device 26 for heating the lambda sensor 24. For this purpose, the control device 30 has a corresponding algorithm in computer-readable form and if necessary appropriate characteristic curves and characteristic fields.

Figure 2:
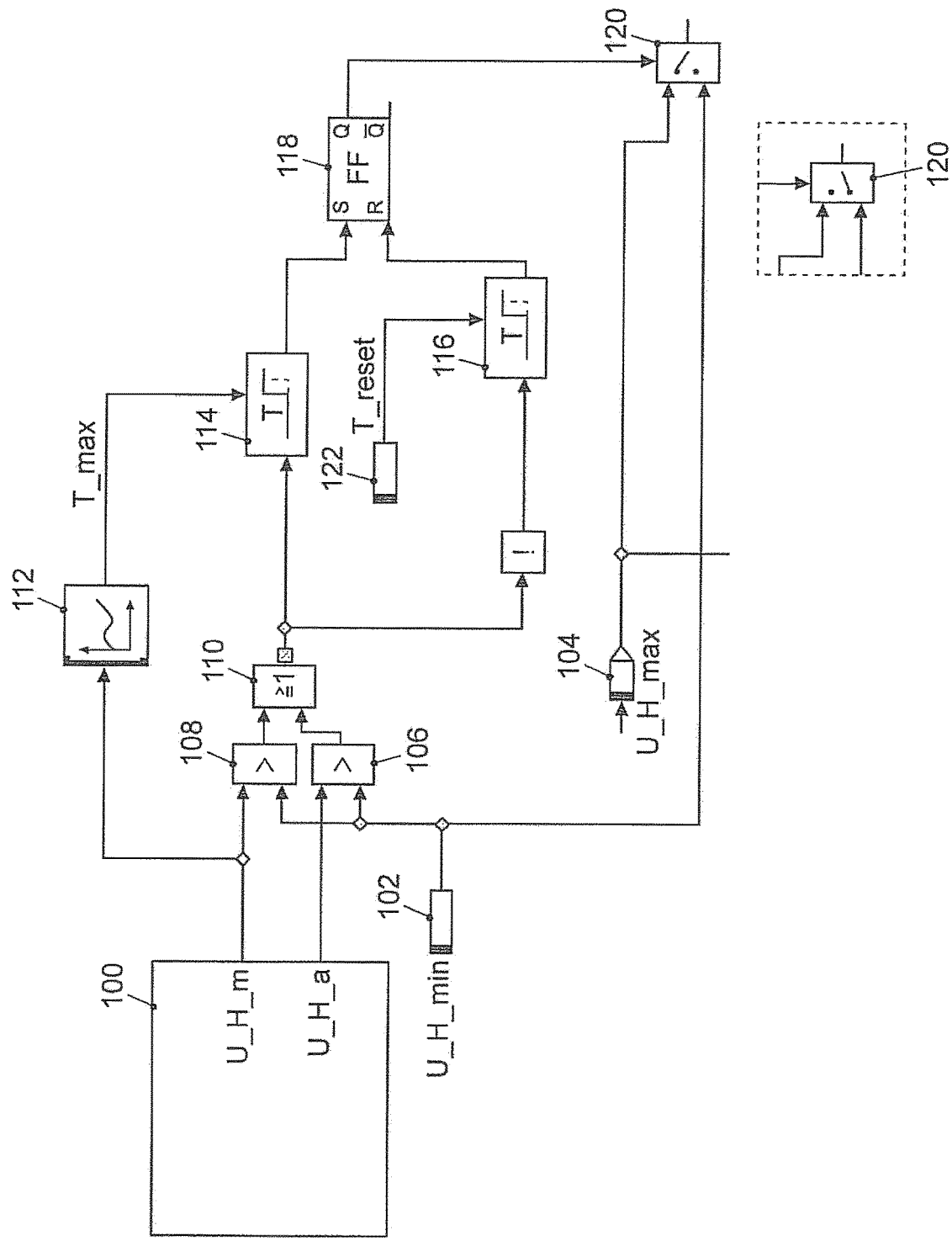
FIG. 2 illustrates a logic diagram of the method in accordance with the invention for controlling the process of heating the lambda sensor and FIG. 3 illustrates time graphs of the current heating voltage and the mean heating voltage during the process of heating a lambda sensor using the method in accordance with the invention.

The present invention is explained hereinunder using the example of heating the lambda sensor 24 with reference to the logic diagram illustrated in FIG. 2.

In the first block 100, the current heating voltage U_H_a at which the heating device 26 of the lambda sensor 24 is influenced is initially read in. In particular, the current battery voltage of the vehicle battery is read in as the current heating voltage U_H_a, unless the heating device 26 is influenced by a lower voltage. In addition, a mean heating voltage U_H_m is ascertained in dependence upon the current heating voltage U_H_a for an immediately preceding period of time. The period of time for ascertaining the mean amounts to 8 seconds in the present example. The mean heating voltage U_H_m is ascertained by means of mathematically averaging the current heating voltage U_H_a of the heating device 26 over the intended period of time of 8 s, said current heating voltage being ascertained in each cyclically repeating step.

The output values from block 100 are received as input values into the comparison blocks 106 and/or 108. In block 106, the query is made as to whether the current heating voltage U_H_a is greater than a minimum heating voltage U_H_min that is predetermined in block 102. In block 108, the query is made as to whether the mean heating voltage U_H_m of the preceding 8 seconds is greater than the minimum heating voltage U_H_min. The minimum heating voltage U_H_min corresponds preferably to a voltage that is as high as possible without causing damage to the lambda sensor 24 when applied permanently. The output values of the query blocks 106 and 108 are received by the query block 110 that checks whether at least one of the queries 106 or 108 has been affirmed, in other words whether the current heating voltage U_H_a and/or the mean heating voltage U_H_m is greater than the minimum heating voltage U_H_min. Thus, the block 110 is a non-exclusive OR-query. If this query is affirmed, block 110 generates the output signal "true". If, on the other hand, the query in 110 is answered in the negative, in other words the two parameters U_H_a and U_H_m are less than or equal to U_H_min, block 110 generates the output signal "false".

Moreover, in dependence upon the mean heating voltage U_H_m, a maximum permissible duration of the heating period T_max is determined in each cycle, beyond which the lambda sensor 24 may be heated using the current heating voltage U_H_a taking into consideration the preceding heating process during the previous period of time of 8 s. For this purpose, the maximum permissible duration of the heating period T_max is read out in dependence upon the specific mean heating voltage U_H_m in block 112 by means of a characteristic curve that is stored in the control device 30. The following applies: the higher the mean heating voltage U_H_m is, in other words the higher the previous thermal loading of the lambda sensor 24 was, the lower the maximum permissible duration of the heating period T_max.

As soon as the block 110 outputs the signal "true", in other words the currently applied current heating voltage U_H_a and/or the mean heating voltage U_H_m is greater than the minimum heating voltage U_H_min, an elapsed-time meter begins to run. The period of time during which the value "true" appears is summated in block 114 and compared with the maximum permissible duration of the heating period T_max that is ascertained in block 112. As soon as the integrator has established in block 114 that the maximum permissible duration of the heating period T_max has been achieved, in other words one of the two parameters U_H_a and/or U_H_m for the duration of the maximum permissible heating period T_max has exceeded the minimum heating voltage U_H_min, the output signal of block 114 assumes the value "true".

This value is forwarded to the flip-flop block 118. This flip-flop element is a storage element, which for its part assumes the value "true" as soon as the condition at the input S (Setup) is fulfilled and which assumes the value "false" if the condition "true" is fulfilled at the input R (Reset). The flip-flop element 118 actuates the adjoining switch 120. The switch 120 connects the heating device 26 of the lambda sensor 24 either to the maximum permissible heating voltage U_H_max, which is specified in block 104 as a component-specific parameter, or to the lower minimum heating voltage U_H_min in block 102. When the switch 120 is in the switch position illustrated in FIG. 2, the maximum permissible heating voltage U_H_max is applied at the heating device 26. As soon as the flip-flop element 118 is set by virtue of the condition at the input S being fulfilled, in other words the maximum permissible duration of the heating period T_max is achieved, the switch 120 is actuated and set to the position illustrated in the lower portion of FIG. 2. From this point in time, the heating device 26 is influenced by the minimum heating voltage U_H_min.

The current heating voltage U_H_a assumes a corresponding value for as long as the heating device 26 is operated at the minimum heating voltage U_H_min and the query in block 106 is negative. The mean heating voltage U_H_m also drops after a specific delay to the minimum heating voltage U_H_min so that the query in block 108 is negative. As soon as the output signal both in block 106 and also in block 108 assumes the value "false", the output signal of the block 110 also assumes the value "false". As a consequence, the elapsed-time meter is no longer activated in block 114, on the contrary after the inverter has performed the inversion process (cf. block "!")—the elapsed-time meter in block 116 is activated. This establishes whether the period of time during which the minimum heating voltage U_H_min is applied at the heating device 26 exceeds a predetermined reset period of time T_reset.

As soon as the reset period of time T_reset is achieved, in other words the heating device 26 has been operated for the period of time T_reset at the minimum heating voltage U_H_min, the condition at the input R of the flip-flop element 118 is fulfilled and the switch 120 is switched back to the position illustrated in FIG. 2, so that the maximum permissible heating voltage U_H_max is once more applied at the heating device 26.

Figure 3:
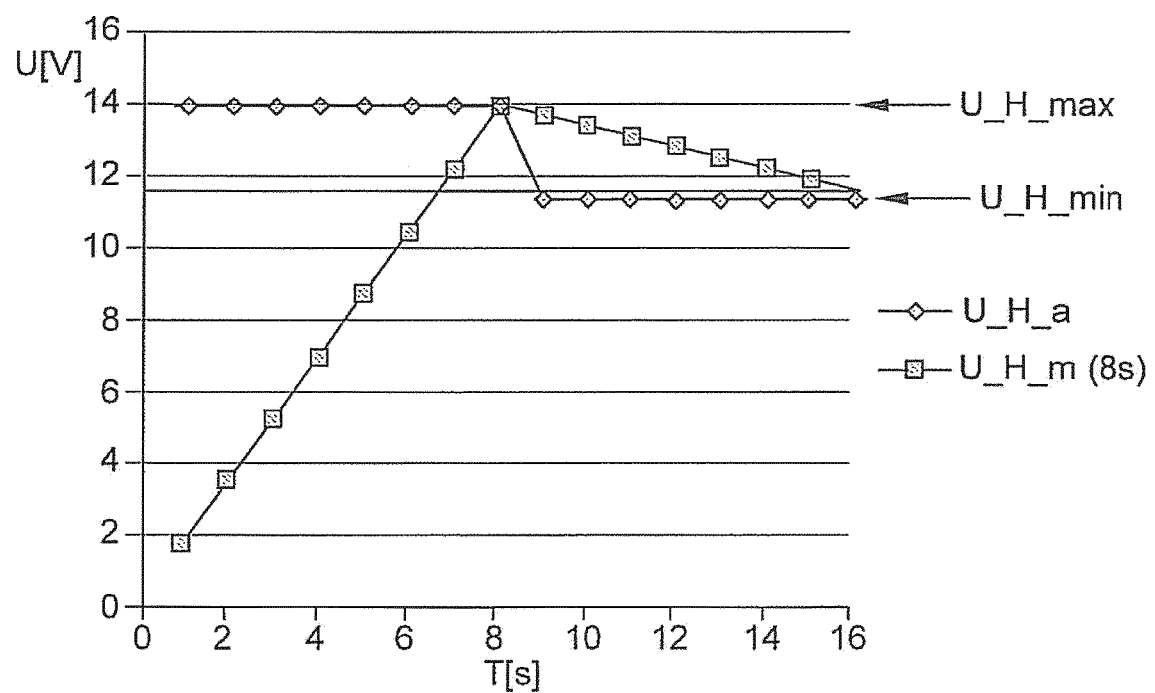

FIG. 3 illustrates the time graph of the heating voltage U_H_a that is currently applied at the heating device 26 and the time graph of the mean heating voltage U_H_m during the course of the control method in accordance with the invention in accordance with FIG. 2. The figure illustrates a heating process following a cold start. The maximum permissible heating voltage U_H_max is 14 volt and the minimum heating voltage U_H_min is 11.5 volt. A permissible duration of the heating period of 8 seconds is specified for the maximum permissible heating voltage U_H_max of 14 volt. The mean heating voltage U_H_m is calculated in each case for an immediately preceding period of time of likewise 8 seconds.

At the commencement of the heating process, the heating device 26 is operated at the maximum permissible heating voltage of 14 volt that is currently also actually supplied by the vehicle battery (cf. curve U_H_a). The mean heating voltage U_H_m only exceeds the minimum heating voltage U_H_min of 11.5 volt after 7 seconds. Said mean heating voltage only corresponds to the maximum permissible heating voltage U_H_max of 14 volt after 8 seconds, although the latter is applied permanently. Therefore, although the maximum permissible duration of the heating period T_max is ascertained only in dependence upon the mean heating voltage U_H_m (cf. block 112 in FIG. 2), for the purpose of ascertaining whether the heating voltage is above the minimum heating voltage U_H_min it is not only the mean heating voltage U_H_m that is queried but the respective currently applied heating voltage U_H_a is also queried. Since the current heating voltage U_H_a is greater than the minimum heating voltage U_H_min from the first second onwards, the elapsed-time meter (block 114 in FIG. 2) is already running from this point in time. As a consequence, the maximum permissible duration of the heating period T_max of 8 seconds is achieved after 8 seconds, so that the heating voltage at this point in time is limited to the minimum heating voltage of 11.5 volt.

Only after 8 seconds have elapsed after the heating device 26 has been switched to the minimum heating voltage of 11.5 does the mean heating voltage U_H_m also drop to this value. From this point time, the elapsed-time meter is activated for the reset period of time T_reset (block 116 in FIG. 2), so that for this period of time both the current heating voltage U_H_a and also the mean heating voltage U_H_m remain at the minimum heating voltage U_H_min (not illustrated in FIG. 3). Only after the reset period of time has elapsed is the switch 120 switched back and the heating device 26 influenced by the full heating voltage U_H_max.

As a result, the heating voltage that is applied at the heating device 26 is consequently switched back and forth between the maximum heating voltage U_H_max and the minimum heating voltage U_H_min. The method terminates as soon as the lambda sensor 24 has achieved its operating temperature. This point in time can be ascertained by way of the internal resistance of the sensor 24. If necessary, the sensor 24 can be further heated in order to maintain the operating temperature but for this purpose generally lower heating voltages are sufficient.

The particular advantage of the method in accordance with the invention resides in the fact that the actual heating history is taken into consideration by virtue of ascertaining the permissible duration of the heating period in dependence upon the mean heating voltage U_H_m during the immediately preceding period of time. If, for example, the actual applied heating voltage U_H_a is less than the desired maximum heating voltage U_H_max, then this has a lengthening effect on the permissible maximum duration of the heating period T_max. As a consequence, the heating process is continued using the possible available heating voltage for a longer period of time than when the maximum heating time T_max is preset in non-variable manner. On the other hand, it is reliably prevented that the permissible thermal loading of the lambda sensor 24 is exceeded.

LIST OF REFERENCE NUMERALS

10 Motor Vehicle
12 Internal Combustion Engine
14 Fuel Injection System
16 Air Intake System
18 Exhaust Gas System
20 Exhaust Gas Duct
22 Exhaust Gas Catalytic Converter
24 Component Lambda Sensor
26 Heating Device
28 Engine Control Device
30 Control Device
U_H_a Current Heating Voltage
U_H_m Mean Heating Voltage
U_H_max Maximum permissible Heating Voltage
U_H_min Minimum Heating Voltage
T_max Maximum permissible Duration of the heating period
T_reset Reset Period of Time

The invention claimed is:

1. A method for controlling a heating device for heating a component, comprising cyclically repeating steps:
    operating the heating device at a heating voltage,
    at a first point in time, ascertaining a current heating voltage currently supplied to the heating device,
    ascertaining a mean heating voltage by averaging a plurality of voltages previously supplied to the heating device during a predetermined period of time immediately preceding the first point in time, wherein the plurality of voltages includes a component specific maximum permissible heating voltage,
    in dependence upon an inverse relationship to the previously supplied mean heating voltage, determining a maximum permissible heating period for which the component may be heated when the current heating voltage or the mean heating voltage is supplied to the heating device, wherein the maximum permissible heating period is determined such that the higher the mean heating voltage is, the lower the maximum permissible heating period will be,
    comparing the current heating voltage and the mean heating voltage with a predetermined minimum heating voltage, and
    reducing the heating voltage of the heating device if at least one of the current heating voltage and the mean heating voltage exceeds the predetermined minimum heating voltage for the duration of the maximum permissible heating period.

2. The method as claimed in claim 1, wherein, during the predetermined period of time immediately preceding the first point in time, the heating device is operated at the component specific maximum permissible heating voltage.

3. The method as claimed in claim 1, wherein the minimum heating voltage is predetermined in such a manner that when said voltage is applied permanently the heated component is not thermally derogated.

4. The method as claimed in claim 3, wherein the minimum heating voltage is predetermined to be as high as possible so that when said voltage is applied permanently, the heated component is not thermally derogated.

5. The method as claimed in claim 3, wherein if at least one of the current heating voltage and the mean heating voltage exceeds the predetermined minimum heating voltage for the duration of the maximum permissible heating period, the heating voltage of the heating device is reduced to the minimum heating voltage or to a lower heating voltage.

6. The method as claimed in claim 1, wherein a current output voltage of an energy source that is operating the heating device is used as the current heating voltage of the heating device, said energy source being in particular a battery.

7. The method as claimed in claim 2, wherein after a predetermined reset period of time has elapsed following a reduction of the heating voltage, the heating device is once more operated at the component specific maximum permissible heating voltage.

8. The method as claimed in claim 7, wherein the reset period of time is the amount of time following the reduction of the heating voltage that it takes for the component to cool down to a non-critical temperature.

9. The method as claimed in claim 1 wherein the component is a sensor.

10. A control device for controlling a heating device for heating a component, which control device is designed for implementing the method as claimed in claim 1.

11. The control device as claimed in claim 10, comprising a stored algorithm in computer-readable form for implementing the method as claimed in claim 1.

12. A motor vehicle comprising an internal combustion engine and an exhaust gas system coupled to said engine, said exhaust gas system comprises an exhaust gas sensor that comprises a heating device for heating said exhaust gas sensor, and a control device as claimed in claim 10.

13. The method as claimed in claim 9 wherein the sensor is an exhaust gas sensor for an internal combustion engine.

14. The method as claimed in claim 9 wherein the sensor is a lambda sensor.

15. The method as claimed in claim 1, wherein maximum permissible heating period has a range of 6 to 10 seconds.

* * * * *